(12) United States Patent
Liao et al.

(10) Patent No.: US 11,738,545 B2
(45) Date of Patent: Aug. 29, 2023

(54) BREATHABLE AND WATERPROOF MEMBRANE AND BREATHABLE AND WATERPROOF FABRIC

(71) Applicant: NAN YA PLASTICS CORPORATION, Taipei (TW)

(72) Inventors: Te-Chao Liao, Taipei (TW); Ching-Yao Yuan, Taipei (TW); Wen-Jui Cheng, Taipei (TW); Chih-Feng Wang, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 0 days.

(21) Appl. No.: 17/237,060

(22) Filed: Apr. 22, 2021

(65) Prior Publication Data
US 2021/0331452 A1 Oct. 28, 2021

(30) Foreign Application Priority Data

Apr. 24, 2020 (TW) ................. 109113710

(51) Int. Cl.
| | | |
|---|---|---|
| *B32B 27/12* | (2006.01) | |
| *B32B 27/08* | (2006.01) | |
| *B32B 27/32* | (2006.01) | |
| *B32B 5/02* | (2006.01) | |
| *B32B 27/20* | (2006.01) | |
| *B32B 37/00* | (2006.01) | |
| *B32B 38/00* | (2006.01) | |
| *B32B 3/26* | (2006.01) | |

(52) U.S. Cl.
CPC ............ *B32B 27/12* (2013.01); *B32B 3/266* (2013.01); *B32B 5/02* (2013.01); *B32B 27/08* (2013.01);
(Continued)

(58) Field of Classification Search
CPC .......... B32B 27/12; B32B 3/266; B32B 5/02; B32B 27/08; B32B 27/20; B32B 27/32;
(Continued)

(56) References Cited

U.S. PATENT DOCUMENTS

| 4,654,401 A | * | 3/1987 | Gallucci | .................. | C08F 8/30 |
| | | | | | 525/67 |
| 2002/0028320 A1 | | 3/2002 | Iwasa et al. | | |

(Continued)

FOREIGN PATENT DOCUMENTS

| CN | 1684999 A | 10/2005 |
| CN | 101448881 A | 6/2009 |

(Continued)

*Primary Examiner* — Maria V Ewald
*Assistant Examiner* — Ethan Weydemeyer
(74) *Attorney, Agent, or Firm* — Li & Cai Intellectual Property Office

(57) ABSTRACT

A breathable and waterproof membrane and a method for manufacturing the same, and a breathable and waterproof fabric are provided. The breathable and waterproof membrane is formed by stretching a polyolefin material. The breathable and waterproof membrane has a density ranging from 0.6 g/cm³ to 0.8 g/cm³. A plurality of micropores are formed on the breathable and waterproof membrane, and the plurality of micropores each has a size smaller than 500 nm. The polyolefin material includes: 60 wt % to 80 wt % of a first polypropylene resin, 15 wt % to 30 wt % of a second polypropylene resin, and 1 wt % to 10 wt % of inorganic particles. The second polypropylene resin is a modified polypropylene resin having a hydrophilic group. The second polypropylene resin is different from the first polypropylene resin.

10 Claims, 3 Drawing Sheets

(52) U.S. Cl.
CPC .............. *B32B 27/20* (2013.01); *B32B 27/32* (2013.01); *B32B 37/156* (2013.01); *B32B 38/0012* (2013.01); *B32B 2038/0028* (2013.01); *B32B 2262/0253* (2013.01); *B32B 2264/10* (2013.01); *B32B 2270/00* (2013.01); *B32B 2307/72* (2013.01); *B32B 2307/724* (2013.01); *B32B 2307/7265* (2013.01)

(58) Field of Classification Search
CPC .............. B32B 37/156; B32B 38/0012; B32B 2038/0028; B32B 2262/0253; B32B 2264/10; B32B 2270/00; B32B 2307/72; B32B 2307/724; B32B 2307/7265
See application file for complete search history.

(56) References Cited

U.S. PATENT DOCUMENTS

| | | |
|---|---|---|
| 2010/0151334 A1 | 6/2010 | Ozaki et al. |
| 2013/0202864 A1 | 8/2013 | Akai et al. |
| 2016/0122484 A1* | 5/2016 | Topolkaraev ....... C08L 23/0815 521/134 |
| 2019/0194412 A1 | 6/2019 | Ishimoto et al. |

FOREIGN PATENT DOCUMENTS

| | | |
|---|---|---|
| CN | 103153618 A | 6/2013 |
| CN | 105518066 A | 4/2016 |
| EP | 1553126 B1 | 12/2013 |
| JP | 2001301001 A | 10/2001 |
| JP | 2016521784 A | 7/2016 |
| WO | WO2017099179 A1 | 6/2017 |

* cited by examiner

BREATHABLE AND WATERPROOF MEMBRANE AND BREATHABLE AND WATERPROOF FABRIC

CROSS-REFERENCE TO RELATED PATENT APPLICATION

This application claims the benefit of priority to Taiwan Patent Application No. 109113710, filed on Apr. 24, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a breathable and waterproof membrane and a method for manufacturing the same, and a breathable and waterproof fabric, and more particularly to a breathable and waterproof membrane and a method for manufacturing the same, and a breathable and waterproof fabric manufactured by a polyolefin material.

BACKGROUND OF THE DISCLOSURE

A breathable and waterproof membrane is a membrane permeable to moisture but impermeable to liquid water. Moisture is water in a gas state and has small volume, which allows it to pass through the breathable and waterproof membrane from one side to another side by capillarity, so that the breathable and waterproof membrane is moisture-permeable. However, when moisture condenses into liquid water, molecules of liquid water tend to aggregate into a molecular cluster under a coaction of surface tension and cohesive force. The molecular cluster has a large size, and can no longer pass through the breathable and waterproof membrane from one side to another side thereby enabling the breathable and waterproof membrane to be waterproof.

One of the applications of the breathable and waterproof membrane is to be applied to garments. When being too high, a body temperature can be regulated through a perspiration mechanism. However, if sweat remains on skin for a long time, uncomfortableness may be induced and bacteria may grow. By using the breathable and waterproof membrane, sweat can be removed and diffused more quickly, thereby maintaining the skin dry and clean. In addition, the breathable and waterproof membrane can prevent outside liquid water from contacting the skin, so as to achieve a waterproof effect.

Commercial breathable and waterproof membrane is manufactured from materials such as polyurethane or thermoplastic polyurethane The breathable and waterproof membrane can be further attached onto a fiber cloth to obtain a breathable and waterproof fabric. Generally, a material of the fiber cloth is polyethylene terephthalate (PET), polypropylene (PP), or nylon, which is different from the material of the common breathable and waterproof membrane. In other words, due to the difference in materials of the breathable and waterproof membrane and the fiber cloth, the breathable and waterproof fabric cannot be directly recycled, but is required to undergo several purification processes, so that a single material for recycling can be separated and obtained.

Accordingly, there is currently no commercially available breathable and waterproof membrane that can simultaneously have a moisture-permeable property, a waterproof property, and a directly-recyclable property after being applied to a conventional fiber cloth.

SUMMARY OF THE DISCLOSURE

In response to the above-referenced technical inadequacies, the present disclosure provides a breathable and waterproof membrane and a method for manufacturing the same, and a breathable and waterproof fabric.

In one aspect, the present disclosure provides a breathable and waterproof membrane. The breathable and waterproof membrane is formed by stretching a polyolefin material. A density of the breathable and waterproof membrane ranges from 0.6 g/cm$^3$ to 0.8 g/cm$^3$. A plurality of micropores each having a size smaller than 500 nm are formed on the breathable and waterproof membrane. The polyolefin material includes 60 wt % to 80 wt % of a first polypropylene resin, 15 wt % to 30 wt % of a second polypropylene resin, and 1 wt % to 10 wt % of inorganic particles. The second polypropylene resin is a modified polypropylene resin having a hydrophilic group. The second polypropylene resin is different from the first polypropylene resin.

In certain embodiments, the first polypropylene resin includes a propylene homopolymer as a main material. The first polypropylene resin optionally includes an ethylene compound, a propylene compound, a butylene compound, an ethylene homopolymer, a butylene homopolymer, an ethylene/propylene copolymer, an ethylene/butylene copolymer, a propylene/butylene copolymer, an ethylene/propylene/butylene copolymer, or any combination thereof.

In certain embodiments, a thickness of the breathable and waterproof membrane ranges from 15 μm to 50 μm. The breathable and waterproof membrane has a hydrostatic pressure resistance ranging from 10000 mmH$_2$O to 20000 mmH$_2$O and a moisture permeability ranging from 5000 g/m$^2$/24 hours to 20000 g/m$^2$/24 hours. In certain embodiments, a particle size of the inorganic particle ranges from 0.05 μm to 2 μm.

In certain embodiments, the hydrophilic group of the second polypropylene resin is at least one selected from the group consisting of: a hydroxyl group, a carboxylic acid group, an amide group, and an amino group.

In another aspect, the present disclosure provides a breathable and waterproof membrane. The breathable and waterproof membrane has a density ranging from 0.6 g/cm$^3$ to 0.8 g/cm$^3$. A plurality of micropores each having a size smaller than 500 nm are formed on the breathable and waterproof membrane. The breathable and waterproof membrane includes a first surface layer, a middle layer, and a second surface layer. The middle layer is disposed between the first surface layer and the second surface layer. The first surface layer is formed from a first material which includes 60 wt % to 80 wt % of a first polypropylene resin and 20 wt % to 40 wt % of a second polypropylene resin. The middle layer is formed from a middle material which includes 60 wt % to 80 wt % of the first polypropylene resin, 15 wt % to 30 wt % of the second polypropylene resin, and 5 wt % to 10 wt % of inorganic particles. The second surface layer is formed from a second material which includes 60 wt % to 80 wt % of the first polypropylene resin and 20 wt % to 40 wt % of the second polypropylene resin. The second polypropylene resin is a modified polypropylene resin having a hydrophilic group. The second polypropylene resin is different from the first polypropylene resin. Based on a total weight of the first material, the middle material, and the second material being 100 wt %, an amount of the inorganic particles ranges from 1 wt % to 10 wt %.

In yet another aspect, the present disclosure provides a breathable and waterproof fabric. The breathable and waterproof fabric includes a fiber cloth and a breathable and waterproof membrane. The breathable and waterproof membrane has a density ranging from 0.6 g/cm$^3$ to 0.8 g/cm$^3$. A plurality of micropores each having a size smaller than 500 nm are formed on the breathable and waterproof membrane. The breathable and waterproof membrane includes a first surface layer, a middle layer, and a second surface layer. The middle layer is disposed between the first surface layer and the second surface layer. The first surface layer is formed from a first material which includes 60 wt % to 80 wt % of a first polypropylene resin and 20 wt % to 40 wt % of a second polypropylene resin. The middle layer is formed from a middle material which includes 60 wt % to 80 wt % of the first polypropylene resin, 15 wt % to 30 wt % of the second polypropylene resin, and 5 wt % to 10 wt % of inorganic particles. The second surface layer is formed from a second material which includes 60 wt % to 80 wt % of the first polypropylene resin and 20 wt % to 40 wt % of the second polypropylene resin. The second polypropylene resin is a modified polypropylene resin having a hydrophilic group. The second polypropylene resin is different from the first polypropylene resin. Based on a total weight of the first material, the middle material, and the second material being 100 wt %, an amount of the inorganic particles ranges from 1 wt % to 10 wt %.

In certain embodiments, the breathable and waterproof membrane is disposed onto the fiber cloth through lamination, coating, or encapsulation.

In yet another aspect, the present disclosure provides a method for manufacturing a breathable and waterproof membrane. The method for manufacturing the breathable and waterproof membrane includes: providing a polyolefin material, calendering the polyolefin material to form a polyolefin sheet, and stretching the polyolefin sheet to form the breathable and waterproof membrane. The polyolefin material includes 60 wt % to 80 wt % of a first polypropylene resin, 15 wt % to 30 wt % of a second polypropylene resin, and 1 wt % to 10 wt % of inorganic particles. The second polypropylene resin is a modified polypropylene resin having a hydrophilic group. The second polypropylene resin is different from the first polypropylene resin. The breathable and waterproof membrane has a density ranging from 0.6 g/cm$^3$ to 0.8 g/cm$^3$. A plurality of micropores each having a size smaller than 500 nm are formed on the breathable and waterproof membrane.

In certain embodiments, the step of stretching the polyolefin sheet includes stretching the polyolefin sheet in a machine direction (MD) and in a transverse direction (TD). A stretching magnification in the MD ranges from 2.5 to 5.0, and a stretching magnification in the TD ranges from 6.0 to 10.0.

In certain embodiments, the polyolefin sheet is stretched in the MD and stretched in the TD sequentially or simultaneously.

Therefore, by virtue of "a polyolefin material being stretched to form the breathable and waterproof membrane", "a plurality of micropores each having a size smaller than 500 nm being formed on the breathable and waterproof membrane" and "the polyolefin material including a first polypropylene resin, a second polypropylene resin, and inorganic particles", the breathable and waterproof membrane is light-weight and can be applied onto the fiber cloth made of the polyolefin material, allowing the breathable and waterproof fabric to be directly recycled.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
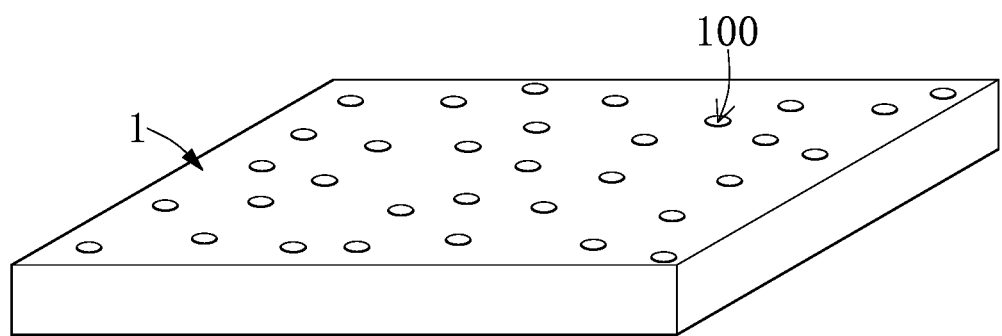
FIG. 1 is a schematic perspective view of a breathable and waterproof membrane according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

In response to the above-mentioned problems, an improved polyolefin material is provided in the present disclosure. The improved polyolefin material can be used to form a breathable and waterproof membrane which has advantages of light-weight and recyclability. When the breathable and waterproof membrane of the present disclosure is applied to a fiber cloth, a light-weight breathable and waterproof fabric can be obtained. In addition, when a material of the fiber cloth and a material of the breathable and waterproof membrane are both polyolefin, the breathable and waterproof fabric further has an advantage of being capable of being recycled directly.

First Embodiment

Referring to FIG. 1, FIG. 1 is a schematic perspective view of a breathable and waterproof membrane of a first embodiment of the present disclosure. A breathable and waterproof membrane 1 of the present disclosure can be a single-layered structure. A plurality of micropores 100 are formed on the breathable and waterproof membrane 1 so that the plurality of micropores 100 can be used as channels to diffuse moisture. In the embodiment, a size of each of the plurality of micropores 100 is smaller than 500 nm. Due to the small size of the micropores 100, moisture can pass through from one side to another side of the breathable and waterproof membrane 1 by capillarity, so that moisture is diffused.

Further, the micropores 100 are formed through two opposite surfaces of the breathable and waterproof membrane 1. Microscopically, in some embodiments, the micropores 100 are not limited to straight channels, but can also be curved channels. The micropores 100 can be communicated with each other or be respectively independent of each other. In other words, the micropores 100 can be connected with each other in series or in parallel to form one or more microporous network. The one or more microporous network can be independent of or partially overlapped with each other. Accordingly, the breathable and waterproof membrane 1 can have more pathways for moisture to pass through, thereby increasing a moisture permeability of the breathable and waterproof membrane 1. However, these details are only feasible implementations provided in the present embodiment, and should not be taken as limiting the scope of the present disclosure.

The breathable and waterproof membrane 1 of the present disclosure is formed from a polyolefin material. Specifically, based on a total weight of the polyolefin material being 100 wt %, the polyolefin material includes 60 wt % to 80 wt % of a first polypropylene resin, 15 wt % to 30 wt % of a second polypropylene resin, and 1 wt % to 10 wt % of inorganic particles.

The first polypropylene resin contains a propylene homopolymer (PP-H) as a main material. In other embodiments, in addition to the propylene homopolymer, the first polypropylene resin can further optionally include ethylene, propylene, butylene, any homopolymer thereof, any copolymer thereof, or any mixture thereof. In other words, the first polypropylene resin can include the propylene homopolymer only or further include an ethylene compound, a propylene compound, a butylene compound, an ethylene homopolymer, a butylene homopolymer, an ethylene/propylene copolymer, an ethylene/butylene copolymer, a propylene/butylene copolymer, an ethylene/propylene/butylene copolymer, or any combination thereof. In addition, types of the copolymers mentioned previously can be a propylene block copolymer (PP-B) or a propylene random copolymer (PP-R). However, the present disclosure is not limited to that disclosed herein.

The second polypropylene resin is a modified polypropylene resin having a hydrophilic group. The second polypropylene resin is different from the first polypropylene resin, and can be a propylene homopolymer (PP-H), a propylene block copolymer (PP-B), a propylene random copolymer (PP-R), or any mixture thereof. The hydrophilic group of the second polypropylene resin is at least one selected from the group consisting of: a hydroxyl group, a carboxylic acid group, an amide group, and an amino group. In a preferable embodiment, the hydrophilic group of the second polypropylene resin is hydroxyl group.

However, the present disclosure is not limited to that disclosed herein. After a polypropylene resin is modified by the hydrophilic group, the polypropylene resin can combine with water molecules more easily, which allows the polypropylene resin to absorb and diffuse moisture more efficiently.

The inorganic particles are at least one selected from the group consisting of: silicon oxide, barium sulfate, calcium carbonate, titanium dioxide, kaolin, talc, zeolite, aluminum oxide, and zinc sulfide. An average diameter ($D_{50}$) of the inorganic particles ranges from 0.05 μm to 2 μm. Preferably, the average diameter ($D_{50}$) of the inorganic particles ranges from 0.1 μm to 1 μm. More preferably, the average diameter ($D_{50}$) of the inorganic particles ranges from 0.2 μm to 0.8 μm. Due to a difference between materials, the inorganic particles are not compatible with the first polypropylene resin or the second polypropylene resin; that is, the inorganic particles are dispersed in the first polypropylene resin or the second polypropylene resin. However, the present disclosure is not limited to that disclosed herein.

The aforesaid first polypropylene resin, the aforesaid second polypropylene resin, and the aforesaid inorganic particles are mixed uniformly and then dried to obtain the polyolefin material. Subsequently, the polyolefin material is put into an extruder and heated to a temperature ranging from 250° C. to 270° C. so as to obtain a melt polyolefin material. The melt polyolefin material is calendered by the extruder and then cooled and solidified to form a polyolefin sheet.

Then, the polyolefin sheet is put into a stretch film machine to perform a machine direction (MD) stretching process and a transverse direction (TD) stretching process, so that the breathable and waterproof membrane 1 can be obtained. In the present embodiment, a stretching magnification in the MD ranges from 2.5 to 5.0, and a stretching magnification in the TD ranges from 6.0 to 10.0. The MD stretching process and the TD stretching process can be implemented sequentially or simultaneously.

After the stretching processes, the micropores 100 are formed on the breathable and waterproof membrane 1, and the micropores 100 each has a size smaller than 500 nm. However, these details are only possible implementations provided by the present embodiment, and should not be taken as limiting the scope of the present disclosure.

In the present disclosure, a melting point of the inorganic particles is higher than melting points of the first polypropylene resin and the second polypropylene resin. Therefore, even if the polyolefin material is melted, extruded, and then stretched, the inorganic particles in the polyolefin material can still maintain their original physical and chemical properties. Specifically, the inorganic particles are in a dispersed phase in a microscopic structure of the polyolefin sheet. Since a molecular structure of the first polypropylene resin is similar to a molecular structure of the second polypropylene resin, the first polypropylene resin and the second polypropylene resin are mixed and in a continuous phase in the microscopic structure of the polyolefin sheet.

In the step of stretching the polyolefin sheet, interstices may be formed near an interface between the continuous phase (i.e., the first polypropylene resin and the second polypropylene resin) and the dispersed phase (i.e., the inorganic particles). After the step of stretching the polyolefin sheet, the interstices become the aforesaid micropores 100 to achieve breathable and waterproof effects.

Figure 2:
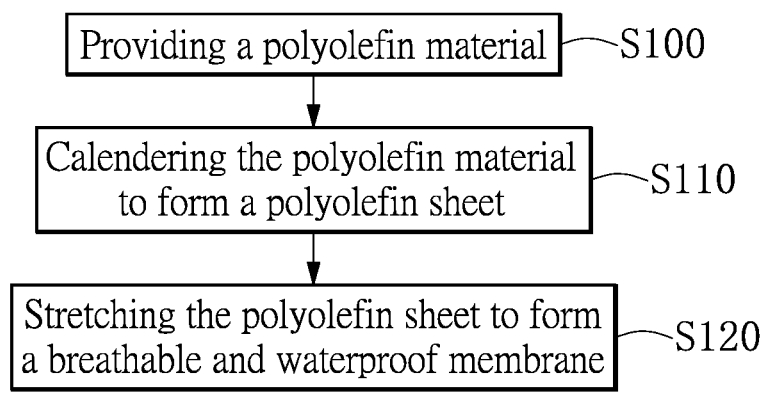
FIG. 2 is a flowchart of a method for manufacturing the breathable and waterproof membrane of the present disclosure.

Referring to FIG. 2, FIG. 2 is a flowchart of a method for manufacturing the breathable and waterproof membrane. Firstly, the polyolefin material is provided (step S100). Next, the polyolefin material is calendered to form the polyolefin sheet (step S110). Then, the polyolefin sheet is stretched to form the breathable and waterproof membrane (step S120).

Second Embodiment

Figure 3:
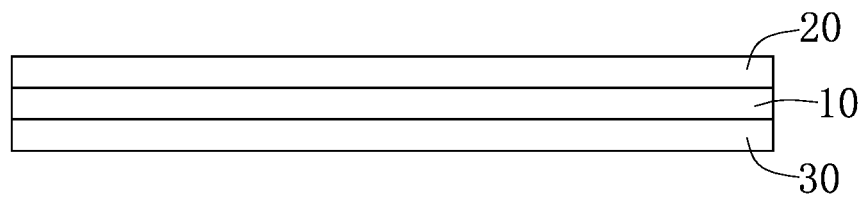
FIG. 3 is a schematic side view of the breathable and waterproof membrane according to a second embodiment of the present disclosure.

Referring to FIG. 3, FIG. 3 is a schematic side view of the breathable and waterproof membrane according to a second embodiment of the present disclosure. The breathable and waterproof membrane 1 can also be a three-layered structure. In the second embodiment, the breathable and waterproof membrane 1 includes a middle layer 10, a first surface layer 20, and a second layer 30. The middle layer 10 is disposed between the first surface layer 20 and the second layer 30. The middle layer 10 is formed from a middle material. The first surface layer 20 is formed from a first material. The second layer 30 is formed from a second material.

The breathable and waterproof membrane 1 of the second embodiment also has the plurality of micropores 100 similar to the micropores 100 in the first embodiment. Apertures of the micropores 100 are smaller than 500 nm. Similarly, moisture can permeate the breathable and waterproof membrane 1 through the micropores 100 by capillarity, resulting in the breathable effect. Molecules of liquid water cannot pass the breathable and waterproof membrane 1 through the micropores 100, resulting in the waterproof effect.

The method for manufacturing the breathable and waterproof membrane 1 of the second embodiment is illustrated as follows. Firstly, in the step of providing the polyolefin material, the middle material, the first material, and the second material are provided respectively. Each of the middle material, the first material, and the second material contains the aforesaid first polypropylene resin and the aforesaid second polypropylene resin. Moreover, ratios of the amounts of the first polypropylene resin and the second polypropylene resin in the middle material, the first material, and the second material can be the same or different.

It should be noted that at least one of the middle material, the first material, and the second material contains the inorganic particles. For example, all the middle material, the first material, and the second material contain the inorganic particles; or two of the middle material, the first material, and the second material contain the inorganic particles; or only one of the middle material, the first material, and the second material contains the inorganic particles.

According to the previous description, types of the first polypropylene resin, the second polypropylene resin, and the inorganic particles of the second embodiment are similar to that of the first polypropylene resin, the second polypropylene resin, and the inorganic particles of the first embodiment, and are not reiterated herein.

In a preferable embodiment, the middle material contains the first polypropylene resin, the second polypropylene resin, and the inorganic particles, and both the first material and the second material contain the first polypropylene resin and the second polypropylene resin.

Specifically, the middle material can contain 60 wt % to 80 wt % of the first polypropylene resin, 15 wt % to 30 wt % of the second polypropylene resin, and 5 wt % to 10 wt % of the inorganic particles. The first material includes 60 wt % to 80 wt % of the first polypropylene resin and 20 wt % to 40 wt % of the second polypropylene resin. The second material includes 60 wt % to 80 wt % of the first polypropylene resin and 20 wt % to 40 wt % of the second polypropylene resin. In addition, based on a total weight of the polyolefin material being 100 wt %, an amount of the inorganic particles ranges from 1 wt % to 10 wt %.

The middle material, the first material, and the second material are uniformly mixed and then dried. Afterwards, the middle material, the first material, and the second material are respectively put into an extruder and heated to a temperature ranging from 250° C. to 270° C., thereby forming a melted middle material, a melted first material, and a melted second material. Subsequently, the melted middle material, the melted first material, and the melted second material are calendered by using a three-layered T-die. After being cooled and then solidified by a roller, the polyolefin sheet is formed (step S110). The polyolefin sheet is a three-layered structure.

The polyolefin sheet is fed into a stretch film machine and then stretched in a machine direction (MD) and in a transverse direction (TD) by the stretch film machine to obtain the breathable and waterproof membrane 1 of the present disclosure (step S120). In a preferable embodiment, a stretching magnification in the MD ranges from 2.5 to 5.0, and a stretching magnification in the TD ranges from 6.0 to 10.0. However, the example illustrated above is only one of the available embodiments and should not be taken as limiting the scope of the present disclosure.

In the second embodiment, although only the middle material forming the middle layer contains the inorganic particles, by configuring a larger stretching magnification, interstices can still be formed at the interface between the dispersed phase and the continuous phase. Therefore, the plurality of the micropores 100 communicating the two opposite surfaces of the breathable and waterproof membrane 1 can be formed. The plurality of the micropores 100 can communicate with each other in series or in parallel to form one or more microporous networks. Further, the one or more microporous networks can be independent of or partially overlapped with each other.

[Property Test]

To prove advantages of the breathable and waterproof membrane 1 of the present disclosure, the breathable and waterproof membranes 1 of Examples 1 to 3 and Comparative Example 1 are prepared by using the materials listed in Table 1. Further, the breathable and waterproof membranes 1 of Examples 1 to 3 and Comparative Example 1 are stretched by a stretching magnification in the MD of four times and a stretching magnification in the TD of eight times.

In the breathable and waterproof membranes 1 of Examples 1 to 3 and Comparative Example 1, a thickness ratio of the middle layer 10 is 80%, a thickness ratio of the first surface layer 20 is 10%, and a thickness ratio of the second surface layer 30 is 10%. Based on a total weight of the first material, the middle material, and the second material being 100 wt %, an amount of the inorganic particles ranges from 1 wt % to 10 wt %.

A density, a moisture permeability, and a hydrostatic pressure resistance of each of the breathable and waterproof membranes 1 of Examples 1 to 3 and Comparative Example 1 are measured, and results are listed in Table 1.

According to Table 1, the breathable and waterproof membrane 1 of the present disclosure has good moisture-permeable and waterproof properties. Specifically, when a thickness of the breathable and waterproof membrane 1 ranges from 15 μm to 50 μm, the hydrostatic pressure resistance of the breathable and waterproof membrane 1 of the present disclosure can range from 10000 mmH$_2$O to 20000 mmH$_2$O, and the moisture permeability of the breathable and waterproof membrane 1 of the present disclosure can range from 5000 g/m$^2$/24 hours to 20000 g/m$^2$/24 hours. Besides the advantages of waterproof and moisture-permeable properties, the breathable and waterproof membrane 1 of the present disclosure further has an advantage of being light-weight. A density of the breathable and waterproof membrane 1 of the present disclosure is measured and ranges from 0.6 g/cm$^3$ to 0.8 g/cm$^3$.

TABLE 1 materials to form the breathable and waterproof membrane and properties of the breathable and waterproof membrane in Examples 1 to 3 and Comparative Example 1.

| Polyolefin Material | | Example 1 | Example 2 | Example 3 | Comparative Example 1 |
|---|---|---|---|---|---|
| First material (accounting for 10 wt % of the polyolefin material) | First polypropylene resin (phr) | 80 | 70 | 70 | 100 |
| | Second polypropylene resin (phr) | 20 | 30 | 30 | — |
| Middle material (accounting for 80 wt % of the polyolefin material) | First polypropylene resin (phr) | 80 | 80 | 80 | 95 |
| | Inorganic particles (phr) | 20 | 20 | 20 | — |
| | Second polypropylene resin (phr) | 5 | 5 | 5 | 5 |
| Second material (accounting for 10 wt % of the polyolefin material) | First polypropylene resin (phr) | 80 | 70 | 70 | 100 |
| | Second polypropylene resin (phr) | 20 | 30 | 30 | — |
| Property | Density (g/cm$^3$) | 0.73 | 0.70 | 0.71 | 0.75 |
| | Thickness (μm) | 20 | 20 | 40 | 20 |
| | Moisture permeability (g/m$^2$/24 hours) | 13000 | 20000 | 9000 | 200 |
| | Hydrostatic pressure resistance (mmH$_2$O) | 12500 | 12000 | 15000 | 13000 |

Third Embodiment

Figure 4:
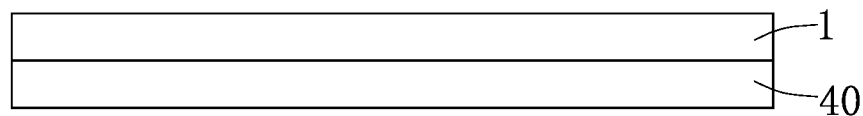
FIG. 4 is a schematic side view of a breathable and waterproof fabric according to a third embodiment of the present disclosure.

Referring to FIG. 4, FIG. 4 is a schematic side view of a breathable and waterproof fabric according to a third embodiment of the present disclosure. A breathable and waterproof fabric 2 includes the aforesaid breathable and waterproof membrane 1 and a fiber cloth 40. The breathable and waterproof membrane 1 is disposed on the fiber cloth 40 to obtain the breathable and waterproof fabric 2.

To allow the fiber cloth 40 to have moisture-permeable and waterproof properties, the breathable and waterproof membrane 1 of the third embodiment is disposed onto the fiber cloth 40 through lamination. Specifically, an adhesive can be applied to connect the breathable and waterproof membrane 1 that is prepared and the fiber cloth 40. Further, the fiber cloth 40 is completely covered by the breathable and waterproof membrane 1 so as to obtain the breathable and waterproof fabric 2. The adhesive can be applied by dispensing or roll coating. However, the present disclosure is not limited to that disclosed herein.

In other embodiments, the breathable and waterproof membrane 1 can be disposed onto the fiber cloth 40 through coating or encapsulation.

Specifically, in a coating process, a coating paste containing the aforesaid polyolefin material is applied onto an outer surface of the fiber cloth 40 by comma coating or roll coating. After being dried or solidified, the polyolefin material in the coating paste can be formed on the fiber cloth 40, thereby forming the breathable and waterproof fabric 2. However, the present disclosure is not limited to that disclosed herein.

Specifically, in an encapsulation process, fibers are immersed into a solution containing the aforesaid polyolefin material, and then a solution thin layer is attached onto an outer surface of the fibers. After being dried or solidified, the solution thin layer attached on the fibers becomes a polyolefin thin layer. Subsequently, the treated fibers can be woven by various weaving technologies into a cloth, thereby forming the breathable and waterproof fabric 2.

According to the previous description, the breathable and waterproof membrane 1 of the present disclosure can be formed onto the fiber cloth 40 either by coating, lamination or encapsulation. However, the present disclosure is not limited to that disclosed herein.

In the present disclosure, a material of the fiber cloth 40 is polyolefin. In other words, the breathable and waterproof membrane 1 of the present disclosure has a same material as the fiber cloth 40. Therefore, the breathable and waterproof fabric 2 manufactured from the breathable and waterproof membrane 1 and the fiber cloth 40 is light-weight and can be directly recycled.

Beneficial Effects of the Embodiments

In conclusion, by virtue of "a polyolefin material being stretched to form the breathable and waterproof membrane 1", "a plurality of micropores 100 each having a size smaller than 500 nm being formed on the breathable and waterproof membrane 1" and "the polyolefin material including a first polypropylene resin, a second polypropylene resin, and inorganic particles", the breathable and waterproof membrane 1 is light-weight and can be applied onto the fiber cloth 40 made of the polyolefin material, and the breathable and waterproof fabric 2 can be directly recycled.

Further, by virtue of "a thickness of the breathable and waterproof membrane 1 ranging from 15 μm to 50 μm", the breathable and waterproof membrane 1 can have a good hydrostatic pressure resistance and moisture permeability.

Further, by virtue of "the particle size of the inorganic particle ranging from 0.05 μm to 2 μm", the plurality of micropores 100 each having a size smaller than 500 nm can be formed on the breathable and waterproof membrane 1, so that the breathable and waterproof membrane 1 has good moisture-permeable and waterproof properties.

Further, by virtue of "the material of the fiber cloth 40 being polyolefin", the breathable and waterproof fabric 2 is light-weight and can be directly recycled.

Further, by virtue of "a stretching magnification in the MD ranging from 2.5 to 5.0" and "a stretching magnification in the TD ranging from 6.0 to 10", the plurality of micropores 100 each having a size smaller than 500 nm can be formed on the breathable and waterproof membrane 1, so that the breathable and waterproof membrane 1 has good moisture-permeable and waterproof properties.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A breathable and waterproof membrane, having a density ranging from 0.6 g/cm$^3$ to 0.8 g/cm$^3$, wherein a plurality of micropores each having a size smaller than 500 nm are formed on the breathable and waterproof membrane, a polyolefin material is stretched to form the breathable and waterproof membrane, and the polyolefin material is consisting of:
   60 wt % to 80 wt % of a first polypropylene resin;
   15 wt % to 30 wt % of a second polypropylene resin that is a modified polypropylene resin having a hydroxyl group; and
   1 wt % to 10 wt % of inorganic particles;
   wherein the inorganic particles are in a dispersed phase, and the first polypropylene resin and the second polypropylene resin are mixed and in a continuous phase.

2. The breathable and waterproof membrane according to claim 1, wherein the first polypropylene resin includes a propylene homopolymer as a main material, and the first polypropylene resin optionally includes an ethylene compound, a propylene compound, a butylene compound, an ethylene homopolymer, a butylene homopolymer, an ethylene/propylene copolymer, an ethylene/butylene copolymer, a propylene/butylene copolymer, an ethylene/propylene/butylene copolymer, or any combination thereof.

3. The breathable and waterproof membrane according to claim 1, wherein a thickness of the breathable and waterproof membrane ranges from 15 μm to 50 μm, the breathable and waterproof membrane has a hydrostatic pressure resistance ranging from 10000 mmH$_2$O to 20000 mmH$_2$O and a moisture permeability ranging from 5000 g/m$^2$/24 hours to 20000 g/m$^2$/24 hours.

4. The breathable and waterproof membrane according to claim 1, wherein a particle size of the inorganic particle ranges from 0.05 μm to 2 μm.

5. A breathable and waterproof membrane, having a density ranging from 0.6 g/cm$^3$ to 0.8 g/cm$^3$, wherein a plurality of micropores each having a size smaller than 500 nm are formed on the breathable and waterproof membrane, the breathable and waterproof membrane includes:
   a first surface layer formed from a first material which is consisting of 60 wt % to 80 wt % of a first polypropylene resin and 20 wt % to 40 wt % of a second polypropylene resin;
   a middle layer formed from a middle material which includes 60 wt % to 80 wt % of the first polypropylene resin, 15 wt % to 30 wt % of the second polypropylene resin, and 5 wt % to 10 wt % of inorganic particles; and
   a second surface layer formed from a second material which is consisting of 60 wt % to 80 wt % of the first polypropylene resin and 20 wt % to 40 wt % of the second polypropylene resin;
   wherein the middle layer is formed between the first surface layer and the second surface layer;
   wherein the second polypropylene resin is a modified polypropylene resin having a hydroxyl group;
   wherein, based on a total weight of the first material, the middle material, and the second material being 100 wt %, an amount of the inorganic particles ranges from 1 wt % to 10 wt %;
   wherein the inorganic particles are in a dispersed phase, and the first polypropylene resin and the second polypropylene resin are mixed and in a continuous phase.

6. A breathable and waterproof fabric, comprising the breathable and waterproof membrane according to claim 5 and a fiber cloth, wherein the breathable and waterproof membrane is disposed on the fiber cloth, and a material of the fiber cloth is polyolefin.

7. The breathable and waterproof fabric according to claim 6, wherein the breathable and waterproof membrane is disposed onto the fiber cloth through coating, lamination, or encapsulation.

8. A method for manufacturing a breathable and waterproof membrane, comprising:
   providing a polyolefin material which is consisting of 60 wt % to 80 wt % of a first polypropylene resin, 15 wt % to 30 wt % of a second polypropylene resin, and 1 wt % to 10 wt % of inorganic particles; wherein the second polypropylene resin is a modified polypropylene resin having a hydroxyl group;
   calendering the polyolefin material to form a polyolefin sheet; wherein the inorganic particles are in a dispersed phase in a microscopic structure of the polyolefin sheet, and the first polypropylene resin and the second polypropylene resin are mixed and in a continuous phase in the microscopic structure of the polyolefin sheet; and
   stretching the polyolefin sheet to form the breathable and waterproof membrane which has a density ranging from 0.6 g/cm$^3$ to 0.8 g/cm$^3$, wherein a plurality of micropores each having a size smaller than 500 nm are formed on the breathable and waterproof membrane.

9. The method according to claim 8, wherein the step of stretching the polyolefin sheet further includes stretching the polyolefin sheet in a machine direction (MD) and in a transverse direction (TD), a stretching magnification in the MD ranges from 2.5 to 5.0, and a stretching magnification in the TD ranges from 6.0 to 10.0.

10. The method according to claim 9, wherein the polyolefin sheet is stretched in the MD and stretched in the TD sequentially or simultaneously.

\* \* \* \* \*